Patented Mar. 12, 1929.

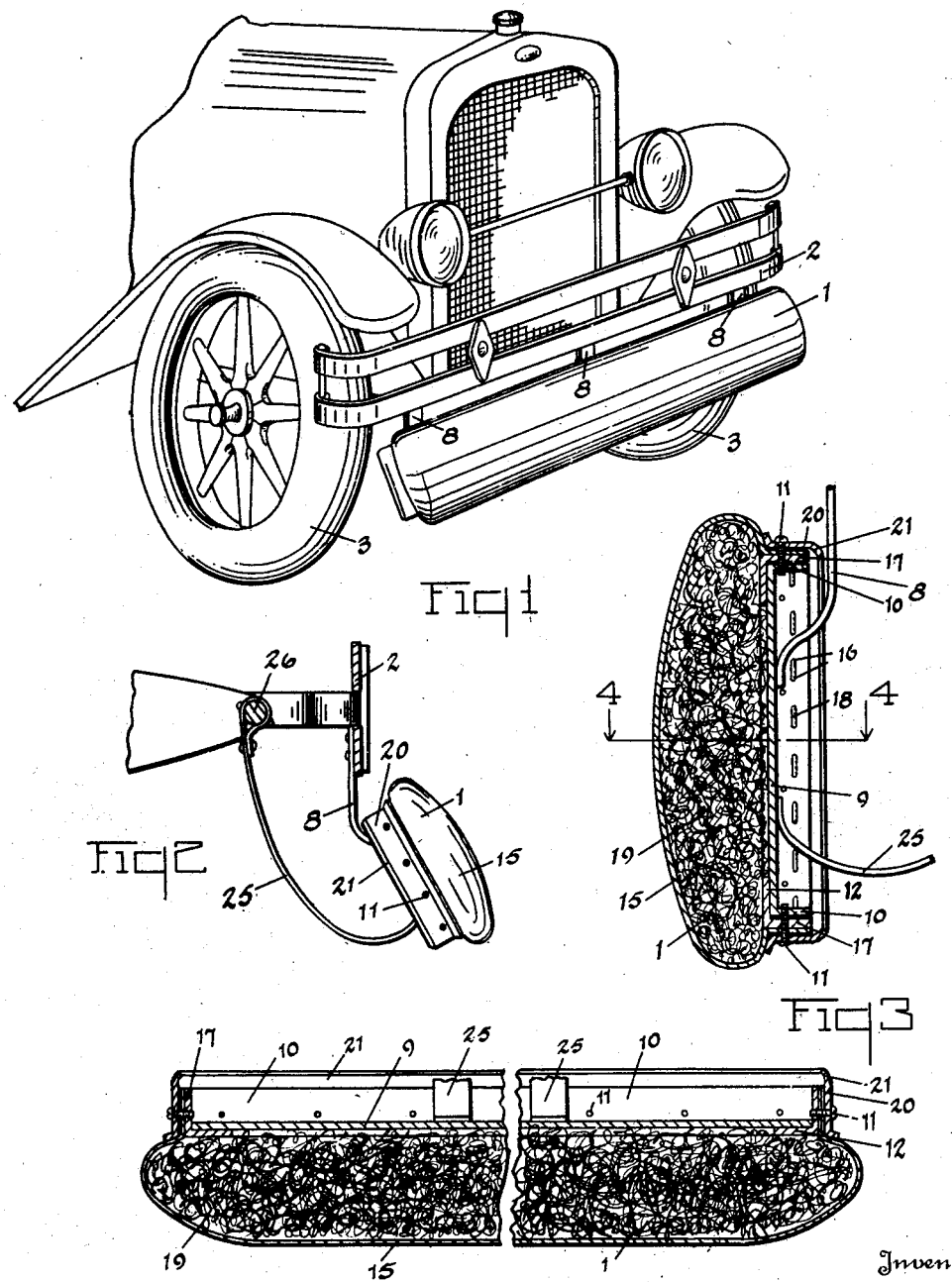

1,704,768

UNITED STATES PATENT OFFICE.

MYER SIGMAN, OF CLEVELAND, OHIO, ASSIGNOR OF FORTY-NINE ONE-HUNDREDTHS TO VINCENT CONGEMI, OF CLEVELAND, OHIO.

SAFETY DEVICE FOR VEHICLES.

Application filed October 17, 1928. Serial No. 312,966.

My invention has for its object to provide a novel and efficient means whereby objects struck by moving vehicles will be moved from the path or ahead of the moving parts of the vehicle. By my invention, pedestrians or other objects struck by automobiles will be swept forward without serious injury until the car is halted. The invention particularly resides in a cushioned member which may be supported on the forward end of the machine and at a height from the ground so that it will not be struck by the ordinary rough spots in the road.

The invention may be contained in structures which vary in their details and, to illustrate a practical application of my invention, I have selected one form as an example of such structures and shall describe it hereinafter. The form selected as an example is shown in the accompanying drawing.

Fig. 1 is a perspective view of an automobile with a cushioned member containing my invention supported thereon. Fig. 2 is a cross-sectional view and illustrates the relative position of the members. Fig. 3 is a view in cross section and in the vertical plane of the cushioned member. Fig. 4 is a view of a section taken on the plane of the line 4—4 as indicated in Fig. 3.

Structures containing my invention may be connected to a suitable bracket located between the ends of the spring horns or may be secured to the bumper located on the forward end of an automobile. In the form of construction shown in Fig. 1, the cushioned member 1 is located in a depending position from the bumper 2. The bumper 2 is connected to the chassis of the car in any suitable manner. The member 1 is located above the level of the road at such a height as to permit free movement of the car over rough stretches of road and yet resiliently strike any obstacle which lies in the path of the car. The member 1 is also of such length as to extend horizontally a distance equal to that between the outer surfaces of the forward wheels 3.

The member 1 is secured to a bar of the bumper 2 by means of hinges or by resilient strips 8 which may be secured to the bar by rivets or bolts. The strips 8 are connected to the member 1 by welding or rivets, the connection being made to the back panel plate 9 of the cushioned member 1. The plate 9 has the flanges 10. The flanges 10 are connected by bolts 11 to the frame 12 of the cushion member 1. The frame 12 is preferably made from L-shaped metal.

The cushion member 1 is provided with a covering 15 which is of a durable waterproof material. The covering 15 is sewed by wire to the frame 12, openings 16 being located in the sides 17 for the wire 18. After the covering 15 has been secured to the frame 12, the interior of the member 1 is filled with a cushioning material such as asbestos wool or other material which is more or less impervious to atmospheric conditions. Quantities of the wool 19 are placed on the inside of the covering 15 until it is filled. The plate 9 is then located on the inside surfaces of the L-shaped frame 12 and as the plate 9 is forced inwardly, the cushion material 19 will be packed into the covering 15, thus producing a firm yet springy cushion.

A strip 20 is then placed on the outer surface of the covering 15 at a point where it is sewed to the frame 12. The strip 20 has bent edge portions. One edge presses the covering 15 against the frame 12 at the corner of the L-shaped frame and the other edge projects beyond and around the edges of the frame 12 and the flanges 10 of the plate 9. The overhanging edge 21 of the strip 20 thus prevents moisture from gathering along the open edges of the covering 15. When the plate 9 and the strip 20 have been located on the frame 12, the bolts 11 are threaded through the members. Thus, a soft cushion is formed on a framework of sufficient strength as to cause the shock of the blow to be absorbed by the supporting members.

In order to provide resilient members for maintaining the cushioned member 1 in its correct position relative to the car and the road, I have secured a plurality of steel springs, or members, of flexible steel, which may be used between the plate 9 and a part of the automobile. The part of the car best suited for this purpose may be the springs or the bar extending between the ends of the springs of the car. In Fig. 2, flexible steel strips 25 are shown connected to the bar 26 and will be best secured by rivets or welding in order to prevent rotation when the cushion member 1 is moved backward. The ends of the strips 25 are also preferably welded to the plate 9. As the plates 8 and the strips 25 are connected to the car, the strips 25 will become bowed, thus exerting an outward pressure at the lower edge of the member 1. The member 1 is located in an inclined position so that the lower edge of the member will be struck first. The first shock and continued pressure or the force created by the opposing obstacle will be absorbed in the strips 25. The continued pressure against the lower edge of the member 1 will also cause it to swing downwardly and rearwardly. Thus, the obstacle struck will be pushed by the moving vehicle and will receive more of the surface of the cushioned member, provided that the weight of the obstacle is sufficient to force the member to swing downward.

I claim:

1. In an automobile buffer, a rectangular shaped cushion member having waterproof flexible covering and packing of cushioning material, means for supporting the cushion member in a position inclined to the road and diagonally forward with respect to the car, spring members connected to the car for yieldingly locating the cushion in position.

2. In an automobile buffer, a rectangular shaped cushion member having waterproof covering and packing of upholstering material, means for supporting the cushion member in a position inclined to the road and diagonally forward with respect to the car, a frame member connected to the covering by means of wire threaded through the frame member and the covering, a plate for covering the frame and enclosing the upholstering material and a flanged strip surrounding the waterproof material, means for clamping the waterproof material between the strip and the frame, springs secured to the frame and connected to the automobile for yieldingly locating the cushion member in position.

In witness whereof I have hereunto signed my name to this specification.

MYER SIGMAN.